(12) United States Patent
Hu et al.

(10) Patent No.: US 10,091,484 B2
(45) Date of Patent: Oct. 2, 2018

(54) METHOD FOR ACQUIRING COMFORT DEGREE OF MOTION-SENSING BINOCULAR STEREOSCOPIC VIDEO

(71) Applicant: TSINGHUA UNIVERSITY, Beijing (CN)

(72) Inventors: Shimin Hu, Beijing (CN); Songpei Du, Beijing (CN); Masia Belen, Beijing (CN); Gutierrez Diego, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 162 days.

(21) Appl. No.: 15/026,576

(22) PCT Filed: Dec. 25, 2013

(86) PCT No.: PCT/CN2013/090462
§ 371 (c)(1),
(2) Date: Mar. 31, 2016

(87) PCT Pub. No.: WO2015/062149
PCT Pub. Date: May 7, 2015

(65) Prior Publication Data
US 2016/0249037 A1    Aug. 25, 2016

(30) Foreign Application Priority Data
Oct. 30, 2013    (CN) .......................... 2013 1 0528899

(51) Int. Cl.
*G06K 9/00*         (2006.01)
*H04N 13/144*      (2018.01)
(Continued)

(52) U.S. Cl.
CPC ......... *H04N 13/144* (2018.05); *G06T 7/0002* (2013.01); *H04N 13/339* (2018.05);
(Continued)

(58) Field of Classification Search
CPC ........... H04N 13/0033; H04N 13/0022; H04N 2013/0085; H04N 2213/002;
(Continued)

(56) References Cited

U.S. PATENT DOCUMENTS 6,496,598 B1 *  12/2002  Harman ............. H04N 13/0022
                                                                348/E13.004
2009/0142041 A1 *  6/2009  Nagasawa .......... H04N 13/0033
                                                                386/341
(Continued)

FOREIGN PATENT DOCUMENTS

| CN | 103096122 A | 5/2013 |
| CN | 103096125 A | 5/2013 |
| CN | 103347196 A | 10/2013 |

OTHER PUBLICATIONS

Kooi, Frank L., and Alexander Toet. "Visual comfort of binocular and 3D displays." Displays 25.2 (2004): 99-108.*
(Continued)

*Primary Examiner* — Li Liu
(74) *Attorney, Agent, or Firm* — McDermott Will & Emery LLP

(57) ABSTRACT

The present invention discloses a method for acquiring a comfort degree of a motion-sensing binocular stereoscopic video. The method includes the following steps: S1. carrying out binocular parallax and movement speed analysis on an input binocular video, and calculating a binocular parallax d, a movement speed vxy in a visual plane direction and a movement speed vz in a depth direction of each pixel point in the video; S2. calculating a corresponding comfort degree value c according to the parameters (d, vxy, vz) of the pixel point; S3. calculating the comfort degree value of the entire frame according to the calculated comfort degree value of each pixel point; S4. calculating the comfort degree value of the entire video according to the comfort degree value of
(Continued)

each frame. The comfort degree of the binocular stereoscopic video is calculated according to the steps in the present invention, so that influence of positive and negative depth ranges and object movement on the comfort degree can be well considered to obtain more accurate estimation of the comfort degree.

6 Claims, 1 Drawing Sheet

(51) Int. Cl.
 H04N 13/339 (2018.01)
 G06T 7/00 (2017.01)
 H04N 13/00 (2018.01)
(52) U.S. Cl.
 CPC ........... G06T 2207/10021 (2013.01); G06T 2207/30168 (2013.01); H04N 2013/0085 (2013.01)
(58) Field of Classification Search
 CPC .. H04N 2013/0081; G06T 2207/10021; G06T 2207/30168; G06T 7/20
 See application file for complete search history.

(56) References Cited

U.S. PATENT DOCUMENTS

2013/0093849 A1* 4/2013 He .................... H04N 13/0029
 348/43
2014/0218487 A1* 8/2014 Lambert ............ H04N 13/0022
 348/51

OTHER PUBLICATIONS

Tam, Wa James, et al. "Stereoscopic 3D-TV: visual comfort." IEEE Transactions on Broadcasting 57.2 (2011): 335-346.*
Jung, Yong Ju, et al. "Visual comfort assessment metric based on salient object motion information in stereoscopic video." Journal of Electronic Imaging 21.1 (2012): 011008-1.*
Choi, Jaeseob, et al. "Visual fatigue modeling and analysis for stereoscopic video." Optical Engineering 51.1 (2012): 017206-1.*
Bi, et al., "A Virtual Comfort Metric for Stereoscopic 3D Video Based on SMDE Approach," Signal Processing, Communication and Computing (ICSPCCC) Dec. 2012, pp. 72-77.
Cho, et al., "Subjective Evaluation of Visual Discomfort Caused from Stereoscopic 3D Video using Perceptual Importance Map," TENCON 2012, IEEE Region 10 Conference, Dec. 2012, pp. 1-6.
Li, et al., "Study on Video 3D AR Systems Comfort Evaluation Method," Abstract, Oct. 2012, accessed from http://encnki.com.cn/article_en/CJFDTOTAL-JSJZ201210012.htm.
International Search Report dated Aug. 4, 2014, which issued in International Application No. PCT/CN2013/090462.

* cited by examiner

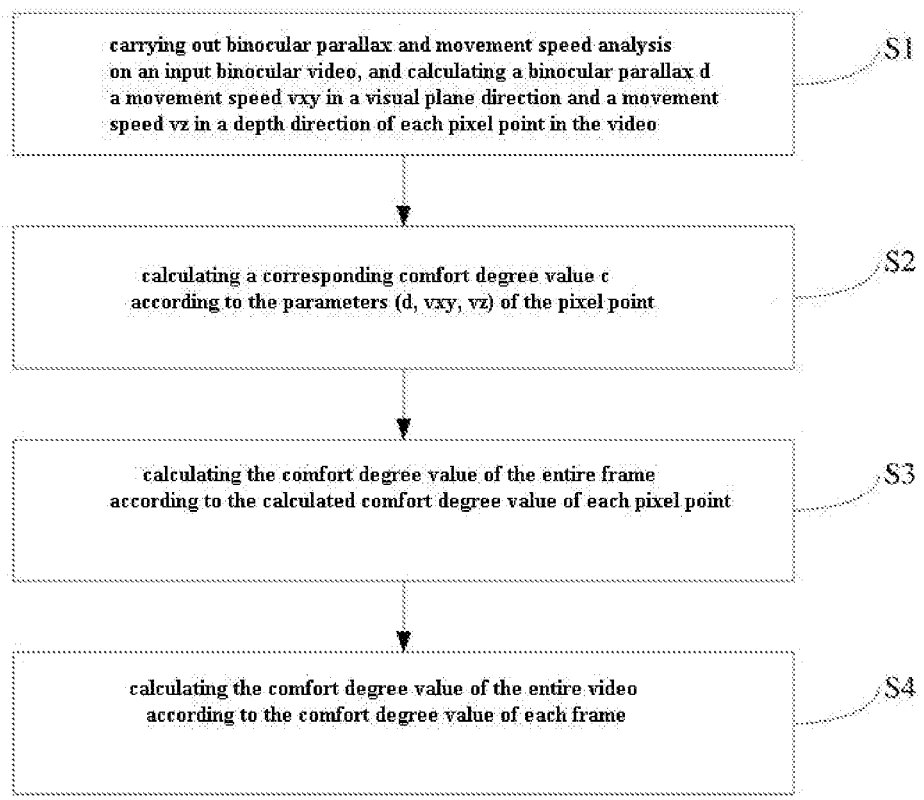

METHOD FOR ACQUIRING COMFORT DEGREE OF MOTION-SENSING BINOCULAR STEREOSCOPIC VIDEO

TECHNICAL FIELD

The present invention relates to the technical field of digital image processing, and particularly relates to a method for acquiring a comfort degree of a motion-sensing binocular stereoscopic video.

BACKGROUND

In the field of computer graphics, binocular stereoscopic images and videos are stereoscopic media formats which are widely studied and used. Binocular stereoscopic technology is used for achieving stereoscopic imaging by displaying different images to left and right eyes on a screen. Due to view angle-focusing mismatch in the imaging technology, when watching binocular stereoscopic videos, people will generate different degrees of discomfort. This discomfort is an important problem in the existing binocular stereoscopic technology, therefore, in order to prevent people from generating severe discomfort and even being incapable of performing binocular stereoscopic fusion when watching the binocular stereoscopic videos, how to measure the comfort degree of the binocular stereoscopic videos has important research and practical significance.

A traditional binocular stereoscopic imaging principle research discloses some factors resulting in discomfort of human eyes and influencing binocular stereoscopic imaging in an experiment mode. Related researches indicate that binocular stereoscopic parallax and object movement speed have great influence on the discomfort degree, the larger the binocular stereoscopic parallax is, and the larger the object movement speed is, the larger the discomfort degree is, but related work in the existing binocular vision field mainly focuses on the qualitative relation description of these factors and lacks quantitative relation analysis, thereby failing to be directly used in practical engineering. In 2012, Jung et al. proposed a method for calculating a discomfort degree based on binocular parallaxes and movement speeds by experiments, but the method is used for independently experimenting and analyzing the binocular parallaxes and movement speeds in different directions in an experiment without considering the mutual relation of these factors, and the calculation method does not involve distinguishing of positive and negative binocular parallaxes. We model an overall parameter space of the binocular parallaxes and three-dimensional object movement speeds to obtain a more accurate and universal calculation method.

SUMMARY

(1) Technical Problem to be Solved

The technical problem to be solved in the present invention is how to provide a method which can be used for calculating a discomfort degree when observing a binocular stereoscopic video according to change of an object movement speed and a parallax in the binocular stereoscopic video.

(2) Technical Solution

To solve the above problem, the present invention provides a method for acquiring a comfort degree of a motion-sensing binocular stereoscopic video. The method includes the following steps: S1. carrying out binocular parallax and movement speed analysis on an input binocular video, and calculating a binocular parallax d, a movement speed $v_{xy}$ in a visual plane direction and a movement speed $v_z$ in a depth direction of each pixel point in the video; S2. calculating a corresponding comfort degree value c according to the parameters (d, $v_{xy}$, $v_z$) of the pixel point; S3. calculating the comfort degree value of the entire frame according to the calculated comfort degree value of each pixel point; S4. calculating the comfort degree value of the entire video according to the comfort degree value of each frame.

Preferably, the step S1 includes: at first, calculating the binocular parallax value at each pixel point according to the binocular video by binocular matching, and then calculating the movement speed $v_{xy}$ in the visual plane direction and the movement speed $v_z$ in the depth direction of each pixel point by using light stream.

Preferably, the step S2 includes: calculating the comfort degree value c at the pixel point according to the parameters (c, $v_{xy}$, $v_z$) calculated in the step S1, in accordance with experimental fitting comfort degree calculation formulae:

$$c=-0.0556*v_{xy}-0.6042*v_z+0.0191*v_{xy}*v_z+0.0022*d*v_{xy}+0.1833*d*v_z-0.6932*d+4.6567$$
$$(d>=0),$$

$$c=-0.0556*v_{xy}-0.6042*v_z+0.0191*v_{xy}*v_z-0.0043*d*v_{xy}-0.1001*d*v_z+0.2303*d+4.6567$$
$$(d<0).$$

Preferably, in the step S3, a comfort degree value corresponding to a pixel with the lowest comfort degree value in each frame is used as the comfort degree value of the frame by using a conservative estimation strategy.

Preferably, in the step S4, for a sequence frame in the video, a median of the comfort degree values of all frames is used as the comfort degree value of the entire video.

(3) Beneficial Effects

The comfort degree of the binocular stereoscopic video is calculated according to the steps in the present invention, so that influence of positive and negative depth ranges and object movement on the comfort degree can be well considered to obtain more accurate estimation of the comfort degree.

BRIEF DESCRIPTION OF THE DRAWINGS

FIG. 1 is a schematic diagram of a flow of a method for acquiring a comfort degree of a motion-sensing binocular stereoscopic video according to an embodiment of the present invention.

DETAILED DESCRIPTION OF THE PREFERRED EMBODIMENTS

A further detailed description of the specific implementations of the present invention will be given below in combination with the accompanying drawings and the embodiments. The following embodiments are merely used for illustrating the present invention, rather than limiting the scope of the present invention.

See FIG. 1, it is a flowchart of the method in the present invention. Input data is a binocular stereoscopic video, and output is an estimated value of the comfort degree of the binocular stereoscopic video. Steps expressed in the FIGURE are as follows:

S1. calculating parameters of pixel points in the video: analyzing input left and right binocular videos, calculating a binocular parallax d at each pixel point by using a binocular matching algorithm, and then calculating a movement speed vxy in a visual plane direction and a movement speed vz in a depth direction of the pixel point in a continuous frame by using a light stream algorithm;

S2. calculating a comfort degree value at the pixel point according to formulae: substituting the above calculated parameters in the following formulae to calculate the comfort degree value c at the pixel point:

$$c=-0.0556*vxy-0.6042*vz+0.0191*vxy*vz+0.0022*d*vxy+0.1833*d*vz-0.6932*d+4.6567$$
$$(d>=0),$$

$$c=-0.0556*vxy-0.6042*vz+0.0191*vxy*vz-0.0043*d*vxy-0.1001*d*vz+0.2303*d+4.6567$$
$$(d<0);$$

S3. calculating the comfort degree of the image frame: according to the comfort degree value at each pixel point calculated in the above step, adopting a conservative strategy to use the comfort degree value of a pixel point with the lowest comfort degree value in the frame as the comfort degree value of the image frame;

S4. calculating the comfort degree of the entire video: according to the comfort degree value of each image frame calculated in the above step, using a median of all numerical values as the comfort degree value of the entire video.

By means of the description of the specific embodiments of the present invention in combination with the accompanying drawings, other aspects and features of the present invention are apparent to those skilled in the art.

The above descriptions are merely preferred implementations of the present invention, it should be noted that those of ordinary skill in the art can make a variety of improvements and substitutions on the premise of not deviating from the technical principle of the present invention, and these improvements and substitutions should be encompassed within the protection scope of the present invention.

INDUSTRIAL APPLICABILITY

The method for acquiring the comfort degree of the motion-sensing binocular stereoscopic video provided by the present invention can be used for effectively calculating the comfort degree of the binocular stereoscopic video and well considering the influence of positive and negative depth ranges and object movement on the comfort degree to obtain more accurate estimation of the comfort degree.

The invention claimed is:

1. A method for acquiring a comfort degree of a motion-sensing binocular stereoscopic video, comprising the following steps:
    S1. carrying out binocular parallax and movement speed analysis on an input binocular video, and calculating a binocular parallax d, a movement speed vxy in a visual plane direction and a movement speed vz in a depth direction of each pixel point in the video;
    S2. calculating a corresponding comfort degree value c according to the parameters (d, vxy, vz) of each pixel point;
    S3. calculating a comfort degree value of an entire frame according to the calculated comfort degree value of each pixel point; and
    S4. calculating the comfort degree value of the entire video according to the comfort degree value of each frame,
    wherein the step S2 comprises: calculating the comfort degree value c at the pixel point according to the parameters (d, vxy, vz) calculated in the step S1, in accordance with experimental fitting comfort degree calculation formulae:

$$c=-0.0556*vxy-0.6042*vz+0.0191*vxy*vz+0.0022*d*vxy+0.1833*d*vz-0.6932*d+4.6567$$
$$(d>=0),$$

$$c=-0.0556*vxy-0.6042*vz+0.0191*vxy*vz-0.0043*d*vxy-0.1001*d*vz+0.2303*d+4.6567$$
$$(d<0).$$

2. The method of claim 1, wherein in the step S3, a comfort degree value corresponding to a pixel with the lowest comfort degree value in each frame is used as the comfort degree value of the frame by using a conservative estimation strategy.

3. The method of claim 2, wherein in the step S4, for a sequence frame in the video, a median of the comfort degree values of all frames is used as the comfort degree value of the entire video.

4. A method for acquiring a comfort degree of a motion-sensing binocular stereoscopic video, comprising the following steps:
    S1. carrying out binocular parallax and movement speed analysis on an input binocular video, and calculating a binocular parallax d, a movement speed vxy in a visual plane direction and a movement speed vz in a depth direction of each pixel point in the video;
    S2. calculating a corresponding comfort degree value c according to the parameters (d, vxy, vz) of each pixel point;
    S3. calculating a comfort degree value of an entire frame according to the calculated comfort degree value of each pixel point; and
    S4. calculating the comfort degree value of the entire video according to the comfort degree value of each frame,
    wherein the step S1 comprises: at first, calculating the binocular parallax value at each pixel point according to the binocular video by binocular matching, and then calculating the movement speed vxy in the visual plane direction and the movement speed vz in the depth direction of each pixel point by using light stream, and
    wherein the step S2 comprises: calculating the comfort degree value c at the pixel point according to the parameters (d, vxy, vz) calculated in the step S1, in accordance with experimental fitting comfort degree calculation formulae:

$$c=-0.0556*vxy-0.6042*vz+0.0191*vxy*vz+0.0022*d*vxy+0.1833*d*vz-0.6932*d+4.6567$$
$$(d>=0),$$

$$c=-0.0556*vxy-0.6042*vz+0.0191*vxy*vz-0.0043*d*vxy-0.1001*d*vz+0.2303*d+4.6567$$
$$(d<0).$$

5. The method of claim 4, wherein in the step S3, a comfort degree value corresponding to a pixel with the lowest comfort degree value in each frame is used as the comfort degree value of the frame by using a conservative estimation strategy.

6. The method of claim 5, wherein in the step S4, for a sequence frame in the video, a median of the comfort degree values of all frames is used as the comfort degree value of the entire video.

* * * * *